US007553477B2

(12) United States Patent
Corma Canós et al.

(10) Patent No.: US 7,553,477 B2
(45) Date of Patent: Jun. 30, 2009

(54) ZEOLITIC MICROPOROUS CRYSTALLINE MATERIAL WITH AN LTA STRUCTURE (ITQ-29), PREPARATION METHOD THEREOF AND USES OF SAME IN ORGANIC COMPOUND SEPARATION AND TRANSFORMATION PROCESSES

(75) Inventors: Avelino Corma Canós, Valencia (ES); María José Sabater Picot, Valencia (ES); Fernando Rey García, Valencia (ES); Susana Valencia Valencia, Valencia (ES)

(73) Assignees: Consejo Superior De Investigaciones Científicas, Madrid (ES); Universidad Politecnica De Valencia, Valencia (ES)

( * ) Notice: Subject to any disclaimer, the term of this patent is extended or adjusted under 35 U.S.C. 154(b) by 231 days.

(21) Appl. No.: 11/517,949

(22) Filed: Sep. 8, 2006

(65) Prior Publication Data
US 2007/0098629 A1   May 3, 2007

Related U.S. Application Data

(63) Continuation of application No. PCT/ES2005/000120, filed on Mar. 9, 2005.

(30) Foreign Application Priority Data

Mar. 11, 2004   (ES)   ................................ 200400662

(51) Int. Cl.
C01B 39/48   (2006.01)
C01B 39/46   (2006.01)
C01B 39/04   (2006.01)

(52) U.S. Cl. .................. 423/718; 423/702; 423/703; 423/705; 423/706; 423/707; 502/60; 502/61; 502/62

(58) Field of Classification Search ................ 423/702, 423/703, 705, 706, 707, 718; 502/60, 61, 502/62

See application file for complete search history.

(56) References Cited

U.S. PATENT DOCUMENTS 2,882,243 A   4/1959   Milton 3,314,752 A   4/1967   Kerr
3,375,205 A   3/1968   Wadlinger et al.
7,109,130 B2 *  9/2006   Davis .................... 438/778
2005/0058596 A1   3/2005   Harbuzaru et al.

FOREIGN PATENT DOCUMENTS

EP   0 337 479 A2   4/1989
WO   WO 03/068679 A1   8/2003

OTHER PUBLICATIONS

Corma, A., et al.; Supramolecular self-assembled molecules as organic directing agent for synthesis of zeolites; Nature, Sep. 2004, vol. 431 (7006), pp. 287-290; ISSN 0028-0836.
H. Kosslick et al, Synthesis and Characterization of Ge-ZSM-5 Zeolites, J. Phys. Chem., 97, (1993), 5678-5684.
Hajime Katayama et al, Synthesis of Julolidines from Anilines, J. Heterocyclic Chem., 19, 925 (1982).
Database of Zeolite Structures of International Zeolite Association (www.iza-structure.org/databases), 2000.
M. O'Keeffe et al, Vertex Symbols for Zeolite Nets, Zeolites 19:370-374, (1997).
W.M. Meier et al, The Topology of Three-Dimensional 4-Connected Nets: Classification of Zeolite Framework Types Using Coordination Sequences, Journal of Solid State Chemistry, 27, 349-355 (1979).
Von G. O. Brunner et al, Zum Problem der Koordinationszahl, Wissenschaftliche Zeitschrift der Technischen Universitat Dresden, 20 (1971) 387-390.

* cited by examiner

*Primary Examiner*—David M Brunsman
(74) *Attorney, Agent, or Firm*—Klauber & Jackson, LLC

(57) ABSTRACT

The invention relates to a material which, once calcined and in the anhydrous state has general formula x $(M_{1/n} XO_2)$:z $ZO_2$:y $GeO_2$:(1−y) $SiO_2$, wherein x has a value of less than 0.2, preferably less than 0.15 and can equal zero; z has a value of between 0 and 0.1, preferably between 0 and 0.05; y has a value of between 0 and 1, preferably between 0 and 0.75; M represents one or more +n charged inorganic cations; X represents one or more +3 oxidation state chemical elements (Al, B, Ga, Fe); and Z represents one or more +4 oxidation state cations different from silicon and germanium, preferably Ti or Sn. Said material can be used as a component of catalysts in acid catalysis processes or as a metal or oxide support in separation and absorption/adsorption processes.

24 Claims, No Drawings

ZEOLITIC MICROPOROUS CRYSTALLINE MATERIAL WITH AN LTA STRUCTURE (ITQ-29), PREPARATION METHOD THEREOF AND USES OF SAME IN ORGANIC COMPOUND SEPARATION AND TRANSFORMATION PROCESSES

RELATED APPLICATIONS

The present application is a continuation of Co-pending PCT Application No. PCT/ES2005/000120, filed on Mar. 9, 2005, which in turn, claims priority from Spanish Application Serial No. P200400662, filed on Mar. 11, 2004. Applicants claim the benefits of 35 USC §120 as to the PCT application, and priority under 35 USC §119 as to the said Spanish Application, and the entire disclosures of both applications are incorporated herein in their entireties.

TECHNICAL FIELD OF THE INVENTION

The present invention belongs in the technical field of microporous crystalline materials of zeolitic nature, useful as adsorbents, catalysts or components of catalysts for transformation and separation processes of organic compounds.

STATE OF THE ART PRIOR TO THE INVENTION

Zeolites are microporous crystalline materials formed by a $TO_4$ tetrahedral lattice that shares all its vortices and thus creates a three-dimensional structure that contains channels and/or cavities of molecular dimensions. Their composition is variable and T generally represents atoms in a +3 formal oxidation state ($T^{III}$) or +4 ($T^{IV}$), such as for instance Si, Ge, Ti, Al, B, Ga, ... When any of the T atoms has an oxidation state lower than +4, the crystalline lattice presents negative charges that are compensated by the presence of organic or inorganic cations in the channels or cavities. Also, channels and cavities may house organic molecules and $H_2O$, and therefore, in a general manner, the chemical composition of zeolites may be represented by the following empirical formula:

$$X(M_{1/n}XO_2):yYO_2:zR:wH_2O$$

where M is one or several +n charged organic or inorganic cations; X is one or several trivalent elements; Y is one or several tetravalent elements, generally Si; and R is one or several organic substances.

Although it is possible to vary the nature of M, X, Y, and R, and the values of x, y, z, and w with post-synthesis treatments, the chemical composition of a zeolite (just as it is synthesized or after calcination) has a range characteristic to each zeolite and its method of obtaining it thereof.

The crystalline structure of each zeolite, with established crystallographic positions of the T atoms that define a specific system of channels and cavities, originates a characteristic X-ray diffraction pattern that helps to differentiate them from each other.

Zeolites with a low Si/Al ratio are generally obtained in the presence of inorganic cations, such as $Na^+$ and $K^+$ that compensate the negative charge introduced by the Al in the lattice. Using organic molecules in the synthesis of zeolites makes possible obtaining materials with a higher Si/Al ratio since their greater size, the number of cations that may be contained in the inside of the zeolites is smaller and, therefore, the Al quantity that can be incorporated is smaller. The organic molecules that act as structure directing agents (SDA) generally contain nitrogen and may originate stable organic cations in the middle of the reaction.

Mobilizing precursor species during zeolite synthesis can be done in the presence of hydroxide anions and basic medium, that can be introduced as a hydroxide of the organic or inorganic cation, such as for example sodium hydroxide or tetrapropylammonium hydroxide. Fluoride ions may also act as mobilizing agents in zeolite synthesis, such as the case described in patent application EP-A-0337479 where HF in $H_2O$ at low pH is used as silicon mobilizing agent to synthesize ZSM-5 zeolite.

Of the known zeolites with a low Si/Al ratio, zeolite A presents channels with small pore size delimited by 8 tetrahedron rings in the three spatial directions that generate supercavities of greater size that correspond to a structure known as LTA ("Linde Type A") structure, according to the *Atlas of Zeolite Framework Types* (2001) published by the International Zeolite Association.

This material is described in patent U.S. Pat. No. 2,882,243 and it is obtained in its sodic form with a Si/Al ratio=1. ZK-4 zeolite, with a Si/Al ratio of up to 2 is obtained by using the tetramethylammonium organic cation as described in patent U.S. Pat. No. 3,314,752 and later alpha zeolite, with a Si/Al ratio of up to 3.5 is obtained as described in patent U.S. Pat. No. 3,375,205.

The technique usually employed to identify the different zeolites is X-ray diffraction. In particular, LTA zeolite, having a Si/Al ratio=1 in its sodic form, as described in patent U.S. Pat. No. 2,882,243, presents as most characteristic diffraction peaks those shown in Table 1. This diffraction peaks are consistent with a cubic symmetry unit cell lattice parameter a=12.32 Å. Table A shows the sum of the squares of the Miller indices observed in the most characteristic reflections of the diffraction pattern for a unit cell such as the one described.

TABLE A

| $(h^2 + k^2 + l^2)$ | d (Å) | I (I/I₀) |
| --- | --- | --- |
| 1 | 12.29 | 100 |
| 2 | 8.71 | 69 |
| 3 | 7.11 | 35 |
| 5 | 5.51 | 25 |
| 9 | 4.107 | 36 |
| 11 | 3.714 | 53 |
| 13 | 3.417 | 16 |
| 14 | 3.293 | 47 |
| 17 | 2.987 | 43 |
| 22 | 2.626 | 22 |

The intensity or position of these diffraction peaks may vary according of the conditions of the media, the degree of hydration of the sample, the chemical composition of the material and the size and shape of the zeolite crystals that make up the sample.

A commercial Na-A zeolite (Molecular sieves 4A supplied by Aldrich) with nominal chemical composition: 1 $Na_2O$:1 $Al_2O_3$:2.0±0.1 $SiO_2$:x $H_2O$ presents an X-ray diffractogram measured in the same conditions as those used in the present invention that contains the diffraction peaks shown in Table B below:

TABLE B

| $(h^2 + k^2 + l^2)$ | d (Å) | I (I/I₀) |
| --- | --- | --- |
| 1 | 12.273 | 80 |
| 2 | 8.684 | 100 |

TABLE B-continued

| $(h^2 + k^2 + l^2)$ | d (Å) | I (I/I$_0$) |
|---|---|---|
| 3 | 7.092 | 36 |
| 5 | 5.493 | 23 |
| 9 | 4.097 | 27 |
| 11 | 3.707 | 41 |
| 13 | 3.410 | 10 |
| 14 | 3.287 | 36 |
| 17 | 2.983 | 38 |
| 22 | 2.623 | 25 |

A commercial CaNa-A zeolite (Molecular Sieves 5A supplied by Aldrich) with nominal chemical composition: 0.80 CaO:0.20 Na$_2$O:1 Al$_2$O$_3$:2.0±0.1 SiO$_2$:x H$_2$O prepared by exchanging Ca ions for Na ions in the Na-A zeolite, ionic exchange methods that have been well described in the literature and do not affect the topology of the zeolite, presents an X-ray diffractogram measured in the same conditions as those used in the present invention that contains the diffraction peaks shown in Table C below:

TABLE C

| $(h^2 + k^2 + l^2)$ | d (Å) | I (I/I$_0$) |
|---|---|---|
| 1 | 12.285 | 100 |
| 2 | 8.694 | 19 |
| 3 | 7.100 | 12 |
| 5 | 5.502 | 7 |
| 9 | 4.104 | 18 |
| 11 | 3.713 | 15 |
| 13 | 3.416 | 3 |
| 14 | 3.292 | 20 |
| 17 | 2.988 | 12 |
| 22 | 2.627 | 10 |

A commercial KNa-A zeolite (Molecular Sieves 3A supplied by Aldrich) with nominal chemical composition: 0.6 K$_2$O:0.40 Na$_2$O:1 Al$_2$O$_3$:2.0±0.1 SiO$_2$:x H$_2$O prepared by exchanging K for Na ions in the NA-A zeolite, ion exchange methods that have been well described in the literature and do not affect the topology of the zeolite, presents an X-ray diffractogram measured in the same conditions as those used in the present invention that contains the diffraction peaks shown in Table D below:

TABLE D

| $(h^2 + k^2 + l^2)$ | d (Å) | I (I/I$_0$) |
|---|---|---|
| 1 | 12.268 | 100 |
| 2 | 8.682 | 60 |
| 3 | 7.092 | 17 |
| 5 | 5.498 | 10 |
| 9 | 4.100 | 16 |
| 11 | 3.711 | 26 |
| 13 | 3.414 | 10 |
| 14 | 3.291 | 20 |
| 17 | 2.987 | 25 |
| 22 | 2.626 | 13 |

It can be deduced by these tables that the relative intensities of the diffraction peaks and the value of the interplanar spaces depend on the used measurement conditions, as well as on other factors such as the chemical composition, exchange cations, degree of hydration of the sample, size of the crystal, preferred orientation, etc.

However, the topology of a zeolitic lattice is independent from the chemical composition, but the spatial group, the dimensions of the unit cell and the atomic coordinates of real material may depend on its chemical composition, although they maintain the topology of the lattice. This is why the International Zeolite Association (that has been authorized by IUPAC to describe the topologies of the various zeolites described so far, as noted in their web site: http://www.iza-structure.org/) describes the zeolitic structures by means of their optimized coordinates, that have been generated in the topological spatial group assuming purely siliceous lattices. Also, two concepts that together describe unequivocally a zeolitic topology have been introduced. These concepts are the Coordination Sequence, first described by Brunner and Laves (Wiss. Z. Tech. Univers. Dresden 20, 387 (1971) H.2.) and have been used to describe topologies of zeolitic materials by Meier and Moeck, J. Solid. State Chem. 27, 349, (1979); and the Vertex Symbols described by O'Keefe and Hyde, Zeolites 19, 370 (1997).

For Zeolite A with LTA structure, the lattice parameters, spatial group and optimized atomic coordinates for a hypothetic SiO$_2$ composition are as follows:

Lattice parameters: a=b=c=11.919; α=β=•=90°

Spatial group: Pm–3m

Atomic coordinates in the Pm–3m spatial group:

| Name | Multiplicity | X | y | z | Symmetry based restrictions | Site symmetry |
|---|---|---|---|---|---|---|
| T$_1$ | 24 | 0 | 0.1823 | 0.3684 | 0, Y, Z | m | where T$_1$ refers to the atomic coordinates of the tetravalent atoms.

The following Coordination Sequence (from the first to the tenth sphere of coordination) and Vertex symbols correspond to this lattice typology:

Coordination Sequence:
  T1 4 9 17 28 42 60 81 105 132 162

Vertex symbols: 4 6 4 6 4 8

Both open bibliographies and patent bibliography show the effort undertaken by many researchers to be able to synthesize a zeolite with LTA structure, but having a high $T^{iv}/T^{iii}$ ratio in order to obtain a material which adsorption and separation properties are very different from those of known zeolitic materials, specially when considering that a zeolite with a LTA structure and having a high $T^{iv}/T^{iii}$ ratio would originate acid solid catalysts and redox with form-selectivity properties. It is then evident that synthesizing LTA zeolites having a $T^{iv}/T^{iii}$ ratio greater than the 3.5 achieved to date represented, not only a scientific-technical challenge, but the possibility of obtaining new materials with properties and uses that would be of industrial interest.

DESCRIPTION OF THE INVENTION

The present invention refers to a microporous crystalline material of zeolitic nature, LTA structure, with low Al content, and even no Al present, its preparation method thereof and its uses in the process of transformation and separation of organic compounds. This material, both in its calcined or synthesized (not calcined) forms has an X-ray diffraction pattern that corresponds to the pattern characteristic of the LTA structure.

The material, once calcined and in anhydrous state, responds to the following general formula:

$$X(M_{1/n}XO_2):zZO_2:yGeO_2:(1-y)SiO_2$$

where x has a value lower than 0.2, preferably lower than 0.15 and may have a value of zero; z has a value between 0 and 0.1, preferably between 0 and 0.05; y has a value between 0 and 1, preferably between 0 and 0.75; M is one or several +n inorganic cations; X is one or several chemical elements in +3 oxidation state (Al, B, Ga, Fe) and Z is one or several cations in +4 oxidation state different from Silica and Germanium, preferably Ti or Sn.

Preferably, the material of the present invention has been prepared from a reaction mixture that contains at least 4-methyl-2,3,6,7-tetrahydro-1H, 5H-pyrido [3,2,1-ij] quinolinium cation as the source for the organic compound.

It is possible, based on the synthesis method and of the calcination or post-treatments, that there are defects in the crystalline lattice that would manifest in the presence of $T^{IV}$-OH groups. These defects have not been included in the previous empirical formula.

In its synthesized state, the X-ray diffraction pattern, measured by a fixed divergence slit and using the Cu—K$\alpha$ radiation of the materials in the present invention, presents, preferably the following diffraction peaks that are more characteristic of spacing values(Å) and relative intensities:

TABLE E

| $(h^2 + k^2 + l^2)$ | d (Å) ± 0.4 | I (I * 100/$I_0$) |
|---|---|---|
| 1 | 12.00 | mf |
| 2 | 8.48 | m |
| 3 | 6.92 | 100 |
| 5 | 5.99 | md |
| 9 | 3.99 | f |
| 11 | 3.61 | d |
| 13 | 3.32 | md |
| 14 | 3.20 | md |
| 17 | 2.90 | md |
| 22 | 2.55 | md |

On the other hand, in its calcined state, the X-ray diffraction pattern presents, preferably, the following spacing values (Å) and relative intensities:

TABLE F

| $(h^2 + k^2 + l^2)$ | d (Å) ± 0.4 | I (I * 100/$I_0$) |
|---|---|---|
| 1 | 12.00 | 100 |
| 2 | 8.47 | f |
| 3 | 6.91 | d |
| 5 | 5.35 | md |
| 9 | 3.98 | md |
| 11 | 3.60 | md |
| 13 | 3.31 | md |
| 14 | 3.19 | md |
| 17 | 2.90 | md |
| 22 | 2.54 | md |

It can be observed that these crystalline characteristics clearly coincide with those that characterized the LTA zeolites.

In these tables
mf is a very strong relative intensity that corresponds to a percentage of 99-80 of the peak of greatest intensity;
f is a strong relative intensity that corresponds to a percentage of 60-80 of the peak of greatest intensity;
m is a medium relative intensity that corresponds to a percentage of 40-60 of the peak of greatest intensity;
d is a weak relative intensity that corresponds to a percentage of 20-40 of the peak of greatest intensity.
md is a very weak relative intensity that corresponds to a percentage lower than 20 of the peak of greatest intensity.

It must be taken into account that the diffraction data may be formed by multiple overlaps or overlaying reflections that, under certain conditions, such as differences in crystallographic changes may appear as resolved or partially resolved lines without it affecting atom connectivity. Generally, the crystallographic changes may include small variations in the unit cell parameters and/or changes in the crystal symmetry without it entailing a change in the structure. Also, the positions, widths and relative intensities of the peaks depend on the chemical composition of the material and on the degree of hydration and the size of the crystal, and the conditions of the media.

In particular, when the lattice is composed exclusively by Silica and Germanium oxides in the absence of Al, with a Si/Ge=2 and it has been synthesized in the presence of fluoride anions using the 4-methyl-2,3,6,7-tetrahydro-1H, 5H-pyrido [3,2,1-ij] quinolinium cation as the structure directing agent, the LTA zeolite, just as synthesized, presents an X-ray diffraction pattern as measured by a fixed divergence slit and using the Cu—K$\alpha$ radiation, that corresponds to that of the spacing values (Å) and the relative intensities ($I/I_0$) as shown in Table I.

TABLE I

| d (Å) + 0.4 | I (I * 100/$I_0$) |
|---|---|
| 11.98281 | 64.51 |
| 8.48639 | 43.77 |
| 6.93364 | 100.00 |
| 6.00729 | 9.93 |
| 5.37471 | 10.70 |
| 4.90932 | 1.78 |
| 4.25241 | 25.62 |
| 4.01009 | 55.68 |
| 3.80432 | 2.04 |
| 3.62785 | 36.08 |
| 3.33792 | 11.79 |
| 3.21671 | 14.86 |
| 2.91690 | 18.65 |
| 2.83469 | 11.47 |
| 2.68905 | 0.80 |
| 2.62482 | 5.22 |
| 2.56477 | 11.65 |
| 2.45548 | 3.45 |
| 2.40561 | 3.49 |
| 2.35907 | 0.99 |
| 2.31516 | 5.37 |
| 2.23402 | 0.71 |
| 2.19577 | 0.93 |
| 2.12495 | 0.41 |
| 2.09314 | 0.32 |
| 2.06338 | 0.83 |
| 2.02767 | 0.59 |
| 2.00499 | 7.48 |
| 1.95178 | 1.93 |
| 1.87895 | 3.00 |
| 1.85648 | 3.31 |
| 1.83466 | 0.84 |
| 1.79343 | 0.82 | which is characteristic of the LTA structure when the lattice parameters are a=b=c=11.983 Å.

The X-ray diffraction pattern of LTA zeolite after calcination at 700° C. is characterized by the spacing values (Å) and relative intensities($I/I_0$) as shown in Table II.

TABLE II

| d (Å) + 0.4 | I (I * 100/I₀) |
|---|---|
| 12.07382 | 100.00 |
| 8.52268 | 57.45 |
| 6.95346 | 40.45 |
| 6.02103 | 1.04 |
| 5.38312 | 9.13 |
| 4.91403 | 1.84 |
| 4.25520 | 9.60 |
| 4.01158 | 8.97 |
| 3.80568 | 1.20 |
| 3.62855 | 7.23 |
| 3.33738 | 3.38 |
| 3.21600 | 3.68 |
| 2.91818 | 3.71 |
| 2.83603 | 1.87 |
| 2.69020 | 0.49 |
| 2.62544 | 0.85 |
| 2.56298 | 2.39 |
| 2.49436 | 0.08 |
| 2.45390 | 0.41 |
| 2.40395 | 0.53 |
| 2.35935 | 0.42 |
| 2.31317 | 0.80 |
| 2.23183 | 0.08 |
| 2.19392 | 0.12 |
| 2.12214 | 0.03 |
| 2.09226 | 0.05 |
| 2.06157 | 0.15 |
| 2.00302 | 0.84 |
| 1.87707 | 0.39 |
| 1.85442 | 0.46 |
| 1.83318 | 0.07 |

This diffractogram can be indexed according to a cubic unit cell with a lattice parameter of 12.015 Å. The results of the Rietveld refinement using the LTA zeolite in a Pm–3m symmetry group are shown in the table below:

| | Atomic coordinates[a,b] for ITQ-29 (Si:Ge = 2.2) | | | | |
|---|---|---|---|---|---|
| Atom | x | y | z | N° of positions | Wyckoff Notation |
| T[c] | 0.3700 (1) | 0.1840 (1) | 0 | 24 | k |
| O1 | ½ | 0.2118 (5) | 0 | 12 | h |
| O2 | 0.2946 (5) | x | 0 | 12 | i |
| O3 | 0.3370 (3) | 0.1095 (4) | y | 24 | m |

[a] Obtained from the Reitveld refinement process (Pm-3m spatial group; a = 12.0157 (4) Å
[b] Estimated standard deviations shown in brackets
[c] Refined atomic occupation for position T: 0.69 (2) Si + 0.31 (2) Ge These results indicate without ambiguity that a material that is isostructural to LTA zeolite has been obtained, and therefore said material has an identical coordination sequence and Vertex symbols as the LTA zeolite previously described. This new material has been obtained in the absence of trivalent cations incorporated to the zeolitic lattice. In other embodiments LTA zeolites containing Aluminum in the lattice with T (IV)/Al ratios above 5 have been obtained.

In another particular embodiment of the present invention, when the lattice is composed by Silicon, Germanium and Aluminum oxides with a Si/Ge ratio=2 and (Si+Ge)/Al=7 and has been synthesized in the presence of fluoride anions using the 4-methyl-2,3,6,7-tetrahydro-1H, 5H-pyrido [3,2,1-ij] quinolinium quaternary ammonium and tetramethylammonium cations as the structure directing agents, the LTA zeolite just as synthesized shows an X-ray diffraction pattern measured by a fixed divergence slit and the Cu—Kα radiation as the one shown in Table III.

TABLE III

| d (Å) + 0.4 | I (I * 100/I₀) |
|---|---|
| 11.99618 | 100.00 |
| 8.50668 | 37.84 |
| 6.94605 | 87.43 |
| 6.02033 | 9.80 |
| 5.38309 | 6.61 |
| 4.91099 | 3.46 |
| 4.25881 | 21.15 |
| 4.01616 | 47.98 |
| 3.81253 | 2.82 |
| 3.63317 | 32.54 |
| 3.34614 | 9.68 |
| 3.22177 | 13.04 |
| 2.92651 | 14.74 |
| 2.84092 | 7.75 |
| 2.70116 | 0.71 |
| 2.63670 | 3.94 |
| 2.58932 | 6.15 |
| 2.57310 | 8.68 |
| 2.46778 | 2.38 |
| 2.41857 | 2.70 |
| 2.32534 | 3.55 |
| 2.20352 | 0.62 |
| 2.07299 | 0.71 |
| 2.01237 | 4.82 |
| 1.96058 | 1.17 |
| 1.88951 | 1.97 |
| 1.86155 | 2.08 | that is characteristic of the LTA structure with lattice parameters a=b=c=11.996 Å.

Also, this invention refers to a zeolitic material with LTA structure that is prepared in the absence of trivalent cations incorporated to the lattices and that contains other heteroatoms different from Si or Ge, such as Ti or Sn, in reticular positions. Incorporating Ti or Sn to the LTA zeolite lattice could be done in the absence of Ge, but preferably, the incorporation of Ti or Sn takes place in samples of the LTA structure showing Si/Ge ratios lower than 50 and more preferably, lower than 25.

In another particular embodiment of the present invention, when the lattice is composed by silica, germanium and Ti oxides with a Si/Ge=2 and (Si+Ge)/Ti=100 and it has been synthesized in the presence of fluoride anions using the 4-methyl-2,3,6,7-tetrahydro-1H, 5H-pyrido [3,2,1-ij] quinolinium and the tetramethylammonium cations as structure directing agents, the LTA zeolite, just as synthesized shows an X-ray diffraction pattern measured by a fixed divergence slit and the Cu—Kα radiation, as the one shown in Table IV.

TABLE IV

| d (Å) + 0.4 | I (I * 100/I₀) |
|---|---|
| 12.05002 | 100.00 |
| 8.53320 | 33.92 |
| 6.97033 | 90.77 |
| 6.03921 | 11.01 |
| 5.39747 | 4.65 |
| 4.92855 | 2.13 |
| 4.27257 | 15.19 |
| 4.03159 | 36.34 |
| 3.82064 | 1.85 |
| 3.64670 | 21.51 |
| 3.35595 | 6.52 |
| 3.23268 | 10.07 |
| 2.93276 | 11.47 |

TABLE IV-continued

| d (Å) + 0.4 | I (I * 100/I₀) |
|---|---|
| 2.84608 | 7.29 |
| 2.63919 | 3.74 |
| 2.57898 | 7.50 |
| 2.46932 | 2.08 |
| 2.41959 | 2.36 |
| 2.32821 | 3.77 |
| 2.19709 | 0.50 |
| 2.01508 | 4.28 |
| 1.96107 | 1.22 |
| 1.88902 | 1.88 |
| 1.86570 | 2.45 | that is characteristic of the LTA structure with lattice parameters of a=b=c=12.050 Å.

In another particular embodiment of the present invention, when the lattice is exclusively composed by silicon oxide and it has been synthesized in the presence of fluoride ions using the 4-methyl-2,3,6,7-tetrahydro-1H, 5H-pyrido [3,2,1-ij] quinolinium and the tetramethylammonium cations as structure directing agents, the LTA zeolite, just as synthesized shows an X-ray diffraction pattern measured by a fixed divergence slit and the Cu—Kα radiation, as shown in Table V.

TABLE V

| d (Å) + 0.4 | I (I * 100/I₀) |
|---|---|
| 11.84737 | 77.53 |
| 8.37763 | 19.92 |
| 6.83812 | 100.00 |
| 5.92222 | 14.69 |
| 5.29866 | 3.83 |
| 4.83499 | 2.54 |
| 4.18847 | 22.75 |
| 3.94910 | 63.12 |
| 3.74528 | 1.77 |
| 3.57231 | 30.92 |
| 3.28610 | 7.39 |
| 3.16584 | 14.23 |
| 2.87329 | 14.64 |
| 2.79204 | 9.20 |
| 2.71774 | 1.22 |
| 2.58472 | 5.36 |
| 2.52547 | 8.87 |
| 2.41798 | 2.26 |
| 2.36883 | 1.10 |
| 2.32247 | 1.41 |
| 2.27956 | 3.11 |
| 2.16214 | 2.32 |
| 2.09176 | 3.86 |
| 2.06147 | 1.09 |
| 2.03104 | 1.30 |
| 2.00218 | 1.81 |
| 1.97203 | 7.27 |
| 1.94482 | 0.38 |
| 1.91940 | 1.37 |
| 1.84798 | 3.87 |
| 1.82566 | 3.25 | that is characteristic of the LTA structure with lattice parameters a=b=c=11.847 Å. The X-ray diffraction pattern of purely siliceous LTA zeolite after calcination at 700° C. in air, is characterized by the spacing values and the relative intensities shown in Table VI

TABLE VI

| d (Å) + 0.4 | I (I * 100/I₀) |
|---|---|
| 11.88558 | 100.00 |
| 8.39942 | 54.54 |
| 6.85889 | 37.35 |
| 5.93918 | 1.24 |
| 5.31236 | 12.25 |
| 4.84978 | 2.82 |
| 4.19967 | 11.74 |
| 3.95902 | 14.05 |
| 3.75674 | 1.79 |
| 3.58177 | 13.14 |
| 3.29415 | 4.91 |
| 3.17483 | 6.02 |
| 2.87972 | 6.99 |
| 2.79931 | 2.80 |
| 2.65484 | 0.91 |
| 2.59110 | 1.45 |
| 2.53087 | 3.56 |
| 2.42334 | 0.36 |
| 2.37515 | 0.62 |
| 2.32902 | 0.31 |
| 2.28559 | 0.56 |
| 2.16732 | 1.06 |
| 2.09940 | 0.68 |
| 2.06641 | 0.40 |
| 2.03683 | 0.44 |
| 2.00724 | 0.34 |
| 1.97888 | 2.34 |
| 1.92684 | 0.34 |
| 1.85415 | 1.16 |
| 1.83187 | 0.97 | that are characteristic of the LTA structure with lattice parameters a=b=c=11.885 Å. These parameters coincide with those reported for a hypothetical, purely siliceous lattice of the LTA structure with cubic symmetry in the Pm–3m spatial group (a=b=c=11.919 Å), such as it appears in the zeolitic structures database of the International Zeolite Association (www.iza-structure.org/databases) and which simulated diffractogram, shown in Table VII coincides essentially with that shown in Table VI

TABLE VII

| d (Å) + 0.4 | I (I * 100/I₀) |
|---|---|
| 11.9190 | 100.00 |
| 8.4280 | 50.80 |
| 6.8814 | 39.92 |
| 5.9595 | 1.09 |
| 5.3303 | 12.53 |
| 4.8659 | 2.47 |
| 4.2140 | 13.07 |
| 3.9730 | 6.45 |
| 3.9730 | 8.65 |
| 3.7691 | 2.00 |
| 3.5937 | 14.86 |
| 3.4407 | 0.01 |
| 3.3057 | 6.54 |
| 3.1855 | 8.37 |
| 2.9798 | 0.06 |
| 2.8908 | 7.29 |
| 2.8908 | 2.63 |
| 2.8093 | 2.55 |
| 2.8093 | 1.74 |
| 2.7344 | 0.04 |
| 2.6652 | 1.12 |
| 2.6009 | 2.58 |
| 2.5411 | 6.13 |
| 2.4330 | 0.63 |
| 2.3838 | 0.94 |
| 2.3838 | 0.01 |
| 2.3375 | 0.62 |

TABLE VII-continued

| d (Å) + 0.4 | I (I * 100/I$_0$) |
|---|---|
| 2.3375 | 0.15 |
| 2.2938 | 0.83 |
| 2.2938 | 0.52 |
| 2.2133 | 0.11 |
| 2.2133 | 0.00 |
| 2.1761 | 1.86 |
| 2.1070 | 0.93 |
| 2.0748 | 0.00 |
| 2.0748 | 0.67 |
| 2.0441 | 0.00 |
| 2.0441 | 0.96 |
| 2.0147 | 0.60 |
| 1.9865 | 3.18 |
| 1.9865 | 0.57 |
| 1.9595 | 0.34 |
| 1.9335 | 0.04 |
| 1.9335 | 0.74 |
| 1.8846 | 0.00 |
| 1.8614 | 0.61 |
| 1.8614 | 0.11 |
| 1.8614 | 1.92 |
| 1.8391 | 2.13 |

The expansion or contraction of the lattice parameters of a zeolite is accepted as unequivocal proof of having incorporated the $T^{III}$ or $T^{IV}$ elements different from Si in the lattice (ASTM Standard D3942: "Test Method for Determination of the Unit Cell Dimension of a Faujasite-type Zeolite"; J. Phys. Chem., 97, 1993, 5678-5684), which indicates that in the materials described in this report that have an LTA structure and contain Ge and/or Al, these elements have been effectively incorporated in the zeolite lattice.

The present invention refers, also, to the preparation procedure thereof of an LTA zeolite with low Al content, and even in the total absence of this element. The procedure to prepare this zeolite is carried out in the presence of fluoride anions that serve as mobilizing agents of the precursor species and entails a thermal treatment between 80 and 200° C., preferably between 100 and 200° C., of a reaction mixture than must contain a source of $SiO_2$ (such as, for instance, tetraethylorthosilicate, colloidal silica, amorphous silica). The reaction mixture may contain a source of $GeO_2$ (such as oxide, alcoxide or halide). Optionally, the synthesis mixture may contain Ti or Sn as an additional source of tetravalent elements. Optionally, the synthesis mixture may contain a source of trivalent elements such as Al, B, Ga, or Fe. The mixture contains, in addition, (4-methyl-2,3,6,7-tetrahydro-1H, 5H-pyrido [3,2,1-ij] quinolinium) or several organic compounds, amongst which is the 4-methyl-2,3,6,7-tetrahydro-1H, 5H-pyrido[3,2,1-ij]quinolinium cation, the tetramethylammonium cation and ethylenglycol; a source of fluoride ions, preferably HF; and water. The organic cations are added to the reaction mixture as salts (for instance, a halide) or hydroxides, and additionally, a source of alkaline or alkaline-earths ions are added as either hydroxides or salts.

It must be taken into account that the components of the synthesis mixture may come from different sources, and depending on these sources the crystallization times and conditions may vary. To facilitate the synthesis it may be convenient, on occasion, to also introduce at some point during the preparation process, LTA zeolite crystals (up to 20% by weight in relation to the inorganic oxides present) as promoters of crystallization (seeding).

The organic cation 4-methyl-2,3,6,7-tetrahydro-1H, 5H-pyrido [3,2,1-ij] quinolinium is represented in the following diagram.

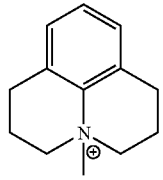

The composition of the reaction mixture from which the low Al content LTA zeolite originates has the following composition in terms of molar relationships:

$r$R:$s$M$_{1/n}$OH:$t$X$_2$O$_3$:$z$ZO$_2$:$u$GeO$_2$:(1−u)SiO$_2$:$v$F: $w$H$_2$O where M is one or more +n charged inorganic cations; X is one or more trivalent elements, preferably Al, B, Ga or Fe; Z is one or more tetravalent elements different from Si and Ge, preferably Ti or Sn; R is one (4-methyl-2,3,6,7-tetrahydro-1H, 5H-pyrido [3,2,1-ij] quinolinium) or more organic compounds, preferably a 4-methyl-2,3,6,7-tetrahydro-1H, 5H-pyrido [3,2,1-ij] quinolinium hydroxide or halide, a tetramethylammonium and ethylenglycol hydroxide or halide as mixtures of the first with some of the others; F is a source of fluoride ions, preferably HF, and the values of r, s, t, z, u, v and w vary in the different ranges:

$r$=R/(SiO$_2$+GeO$_2$)=0.05-1.0

$s$=M$_{1/n}$OH/(SiO$_2$+GeO$_2$)=0-1.0

$t$=X$_2$O$_3$/(SiO$_2$+GeO$_2$)=0-0.1

$z$=ZO$_2$/(SiO$_2$+GeO$_2$)=0-0.1

$u$=GeO$_2$/(SiO$_2$+GeO$_2$)=0-1.0

$v$=F/(SiO$_2$+GeO$_2$)=0.1-3.0

$w$=H$_2$O/(SiO$_2$+GeO$_2$)=1-50

The thermal treatment of the reaction mixture is subjected to may be done statically or while stirring the mixture. Once the crystallization process is completed the solid product is separated by filtration or centrifugation and then it is dried. The calcination, which is later done at temperatures above 350° C., preferably between 400 and 900° C., causes the decomposition of the organic remainder occluded inside the zeolite and their exit thereof, freeing the zeolitic channels.

The material produced by this invention may be pelletized according to known techniques and can be used as a component of catalysts in acidic catalysis processes or as support for metals or oxides in separation and absorption/adsorption processes.

EXAMPLES

Example 1

Preparation of the 4-methyl-2,3,6,7-tetrahydro-1H, 5H-pyrido [3,2,1-ij] quinolinium organic cation The 2,3,6,7,-tetrahydro-1H,5H-pyrido [3,2,1-ij] quinolinium amine was prepared according to the method previously described in the literature (H. Katayama, E. Abe, k. Kaneko, J. Heterocyclic Chem. (1982), 19, 925-926) as described below:

To a round bottomed flask equipped with a reflux condenser and magnetic stirring device 4.7 g of aniline (50 mmol), 21.2 g of sodium carbonate (200 mmol) and 126.4 g of 1-bromo-3-chloropropane (750 mmol) are added. The mixture is gradually heated by vigorous stirring in a nitrogen atmosphere (from 70 to 160° C. in 1 hour and maintained during 24 hours). After cooling, the mixture is basified with NaOH and extracted with three ether portions. The organic extracts thus collected are washed with water and treated with 2N hydrochloric acid. The acid extract is basified with NaOH and extracted with ether. The ethereal extract is washed with NaCl aqueous solution and dried over anhydrous $Na_2SO_4$. The solvent is eliminated by rotavapor to originate the amine with an 85% performance. Later, the amine is quaternized with methyl iodide according to the following procedure:

To a round bottomed flask the following is added: 10 g (57.8 mmol) of the amine dissolved in 100 ml of chloroform, followed by 24.5 g (173 mmol) of methyl iodide and the mixture is stirred at ambient temperature during 3 days. After this time methyl iodide is added again (173 mmol) and is left stirring for 3 more days. After this period of time has passed a solid is collected by filtration, it is thoroughly washed with ether and dried. The resulting quaternary ammonium salt is obtained with a 90% performance.

Example 2

Preparation of the 4-methyl-2,3,6,7-tetrahydro-1H, 5H-pyrido [3,2,1-ij] quinolinium hydroxide The ammonium iodide obtained according to Example 1 is exchanged by hydroxide by using an ionic exchange resin according to the following procedure; 21.8 g (69.2 mmol) of the cation's iodide are dissolved in water. To the obtained solution, 70 g of Dowex SBR resin are added and the solution is continuously stirred until the next day. Later, it is filtered and washed with distilled water resulting in a hydroxide solution of 4-methyl-2,3,6,7,-tetrahydro-1H,5H-pyrido [3,2,1-ij] quinolinium that is valued with HCl (aq.) using phenolphthalein as indicator and obtaining an exchange efficiency above 90%. The final solution contains 0.3 equivalencies of hydroxide per 1000 g of solution.

Example 3

Preparation of an LTA Zeolite in the Absence of $T^{III}$ Cations

First, 3.9 g of tetraethylorthosilicate (TEOS) are added to 46.8 g of a hydroxide solution of 4-methyl-2,3,6,7,-tetrahydro-1H,5H-pyrido [3,2,1-ij] quinolinium (ROH) containing 0.3 hydroxide equivalencies in 1000 g. Over this mixture, 0.98 g of germanium oxide are added and the resulting mixture is left to evaporate while stirring until the ethanol produced by the TEOS hydrolysis and the necessary amount of water have evaporated completely and the final composition as noted has been reached. Finally, 0.56 g of fluorhydric acid (50% of HF by weight) are added. The composition of the resulting gel is:

$0.67SiO_2:0.33GeO_2:0.5ROH:0.5HF:7H_2O$

The mixture obtained is introduced in an autoclave equipped with an internal polytetrafluorethylene sheath and heated at 150° C. during 5 days. The X-ray diffractogram of the solid obtained when filtering, washing with distilled water and dried at 100° C. shows the most characteristics peaks as shown in Table IA.

TABLE IA

| d (Å) | I (I * 100/I$_0$) |
|---|---|
| 11.98281 | 64.51 |
| 8.48639 | 43.77 |
| 6.93364 | 100.00 |
| 6.00729 | 9.93 |
| 5.37471 | 10.70 |
| 4.90932 | 1.78 |
| 4.25241 | 25.62 |
| 4.01009 | 55.68 |
| 3.80432 | 2.04 |
| 3.62785 | 36.08 |
| 3.33792 | 11.79 |
| 3.21671 | 14.86 |
| 2.91690 | 18.65 |
| 2.83469 | 11.47 |
| 2.68905 | 0.80 |
| 2.62482 | 5.22 |
| 2.56477 | 11.65 |
| 2.45548 | 3.45 |
| 2.40561 | 3.49 |
| 2.35907 | 0.99 |
| 2.31516 | 5.37 |
| 2.23402 | 0.71 |
| 2.19577 | 0.93 |
| 2.12495 | 0.41 |
| 2.09314 | 0.32 |
| 2.06338 | 0.83 |
| 2.02767 | 0.59 |
| 2.00499 | 7.48 |
| 1.95178 | 1.93 |
| 1.87895 | 3.00 |
| 1.85648 | 3.31 |
| 1.83466 | 0.84 |
| 1.79343 | 0.82 | which are characteristic of the LTA structure and lattice parameters of a=b=c=11.983 Å.

Calcination at 700° C. in air during 3 hours serves to eliminate the occluded organic species. The X-ray diffraction pattern of the calcined zeolite shows a listing of the most characteristics peaks as shown in Table IIA.

TABLE IIA

| d (Å) | I (I * 100/I$_0$) |
|---|---|
| 12.07382 | 100.00 |
| 8.52268 | 57.45 |
| 6.95346 | 40.45 |
| 6.02103 | 1.04 |
| 5.38312 | 9.13 |
| 4.91403 | 1.84 |
| 4.25520 | 9.60 |
| 4.01158 | 8.97 |
| 3.80568 | 1.20 |
| 3.62855 | 7.23 |
| 3.33738 | 3.38 |
| 3.21600 | 3.68 |
| 2.91818 | 3.71 |
| 2.83603 | 1.87 |
| 2.69020 | 0.49 |
| 2.62544 | 0.85 |
| 2.56298 | 2.39 |
| 2.49436 | 0.08 |
| 2.45390 | 0.41 |
| 2.40395 | 0.53 |
| 2.35935 | 0.42 |
| 2.31317 | 0.80 |
| 2.23183 | 0.08 |
| 2.19392 | 0.12 |
| 2.12214 | 0.03 |
| 2.09226 | 0.05 |
| 2.06157 | 0.15 |
| 2.00302 | 0.84 |

TABLE IIA-continued

| d (Å) | I (I * 100/I₀) |
|---|---|
| 1.87707 | 0.39 |
| 1.85442 | 0.46 |
| 1.83318 | 0.07 | which is characteristic of the LTA structure and lattice parameters of a=b=c=12.074 Å.

Example 4

Preparation of an LTA Zeolite Using Several Organic Compounds as Structure Directing Agents First, 2.6 g of tetraethylorthosilicate (TEOS) are added to 15.6 g of a hydroxide solution of 4-methyl-2,3,6,7,-tetrahydro-1H,5H-pyrido [3,2,1-ij] quinolinium (ROH) containing 0.3 hydroxide equivalencies in 1000 g and 1.7 g of an aqueous solution of 25% tetramethylammonium hydroxide (TMAOH). Over this mixtures 0.65 g of germanium oxide are added and the resulting mixture is left to evaporate while stirring until the ethanol produced by the TEOS hydrolysis and the necessary amount of water have evaporated completely and the final composition as noted has been reached. Finally, 0.37 g of fluorhydric acid (50% of HF by weight) are added. The composition of the resulting gel is:

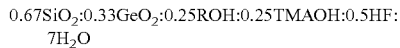
$0.67SiO_2:0.33GeO_2:0.25ROH:0.25TMAOH:0.5HF:7H_2O$

The mixture obtained is introduced in an autoclave equipped with an internal polytetrafluorethylene sheath and heated at 150° C. during 3 days. The X-ray diffractogram of the solid obtained when filtering, washing with distilled water and dried at 100° C. shows that is a LTA zeolite.

Example 5

Preparation of LTA Zeolite with a $T^{IV}/T^{III}=23$

First, 0.166 g of aluminium isopropoxide are added to 2.6 g of tetraethylorthosilicate (TEOS), followed by 32.5 g of a hydroxide solution of 4-methyl-2,3,6,7,-tetrahydro-1H,5H-pyrido [3,2,1-ij] quinolinium (ROH) containing 0.3 hydroxide equivalencies in 1000 g. Over this mixtures 0.65 g of germanium oxide are added and the resulting mixture is left to evaporate while stirring until the ethanol produced by the TEOS hydrolysis plus the necessary amount of water have evaporated completely and the final composition as noted has been reached. Finally, 0.39 g of fluorhydric acid (50% of HF by weight) and a 0.07 g LTA zeolite suspension, obtained according to the method described in Example 3, in water are added. The composition of the resulting gel is:

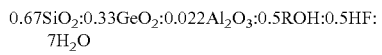
$0.67SiO_2:0.33GeO_2:0.022Al_2O_3:0.5ROH:0.5HF:7H_2O$

The mixture obtained is then introduced in an autoclave equipped with an internal polytetrafluorethylene sheath and heated at 150° C. during 5 days. The X-ray diffractogram of the solid obtained when filtering, washing with distilled water and dried at 100° C. shows that is a LTA zeolite.

Example 6

Preparation of LTA Zeolite with a $T^{IV}/T^{III}=7$

First, 0.545 g of aluminium isopropoxide are added to 2.6 g of tetraethylorthosilicate (TEOS), followed by 17.8 g of a hydroxide solution of 4-methyl-2,3,6,7,-tetrahydro-1H,5H-pyrido [3,2,1-ij] quinolinium (ROH) containing 0.3 hydroxide equivalencies in 1000 g and 1.95 g of a 25% aqueous solution of tetramethylammonium hydroxide (TMAOH). Over this mixtures 0.65 g of germanium oxide are added and the resulting mixture is left to evaporate while stirring until the ethanol produced by the TEOS hydrolysis plus the necessary amount of water have evaporated completely and the final composition as noted has been reached. Finally, 0.43 g of fluorhydric acid solution (50% of HF by weight) and a 0.07 g LTA zeolite suspension, obtained according to the method described in Example 4, in 1 g of water are added. The composition of the resulting gel is:

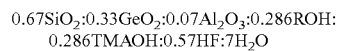
$0.67SiO_2:0.33GeO_2:0.07Al_2O_3:0.286ROH:0.286TMAOH:0.57HF:7H_2O$ the mixture obtained is then introduced in an autoclave equipped with an internal polytetrafluorethylene sheath and heated at 150° C. during 3 days. The X-ray diffractogram of the solid obtained when filtering, washing with distilled water and dried at 100° C. shows that is a LTA zeolite.

Example 7

Preparation of a Purely Siliceous Zeolitic Material with LTA Structure

First, 4 g of tetraethylorthosilicate (TEOS) are added over 16 g of a hydroxide solution of 4-methyl-2,3,6,7,-tetrahydro-1H,5H-pyrido [3,2,1-ij] quinolinium (ROH) containing 0.3 hydroxide equivalencies in 1000 g and 1.75 g of a 25% aqueous solution of tetramethylammonium hydroxide (TMAOH). The mixture is left to evaporate while stirring until the ethanol produced by the TEOS hydrolysis plus the necessary amount of water have evaporated completely and the final composition as noted has been reached. Finally, 0.38 g of fluorhydric acid (50% of HF by weight) is added. The composition of the resulting gel is:

$SiO_2:0.25ROH:0.25TMAOH:0.5HF:3H_2O$

The mixture obtained is then introduced in an autoclave equipped with an internal polytetrafluorethylene sheath and heated at 150° C. during 3 days. The X-ray diffractogram of the solid obtained shows that the material thus obtained is a LTA zeolite.

Example 8

Preparation of an LTA Zeolite having a Si/Ge=1

First, 2 g of tetraethylorthosilicate (TEOS) are added over 15.97 g of a hydroxide solution of 4-methyl-2,3,6,7,-tetrahydro-1H,5H-pyrido [3,2,1-ij] quinolinium (ROH) containing 0.3 hydroxide equivalencies in 1000 g and 1.75 g of a 25% aqueous solution of tetramethylammonium hydroxide (TMAOH). 1 g of germanium oxide is added to this mixture and it is then left to evaporate while stirring until the ethanol produced by the TEOS hydrolysis plus the necessary amount of water have evaporated completely and the final composition as noted has been reached. Finally, 0.38 g of fluorhydric acid (50% of HF by weight) is added. The composition of the resulting gel is:

0.5SiO$_2$:0.5GeO$_2$:0.25ROH:0.25TMAOH:0.5HF: 7H$_2$O

The mixture obtained is then introduced in an autoclave equipped with an internal polytetrafluorethylene sheath and heated at 150° C. during 3 days. The X-ray diffractogram of the solid obtained when filtering, washing with distilled water and dried at 100° C. shows that the material thus obtained is a LTA zeolite.

Example 9

Preparation of an LTA Zeolite having a Si/Ge=20

First, 4 g of tetraethylorthosilicate (TEOS) are added over 16.8 g of a hydroxide solution of 4-methyl-2,3,6,7,-tetrahydro-1H,5H-pyrido [3,2,1-ij] quinolinium (ROH) containing 0.3 hydroxide equivalencies in 1000 g and 1.84 g of a 25% aqueous solution of tetramethylammonium hydroxide (TMAOH). 0.1 g of germanium oxide are added to this mixture and it is then left to evaporate while stirring until the ethanol produced by the TEOS hydrolysis plus the necessary amount of water have evaporated completely and the final composition as noted has been reached. Finally, 0.4 g of fluorhydric acid (50% of HF by weight) are added. The composition of the resulting gel is:

0.952SiO$_2$:0.048GeO$_2$:0.25ROH:0.25TMAOH:0.5HF: 3H$_2$O

The mixture obtained is then introduced in an autoclave equipped with an internal polytetrafluorethylene sheath and heated at 150° C. during 6 days. The X-ray diffractogram of the solid obtained when filtering, washing with distilled water and dried at 100° C. shows that the material thus obtained is a LTA zeolite.

Example 10

Preparation of a Ti Containing LTA Zeolite

First, 2.6 g of tetraethylorthosilicate (TEOS) and 0.043 g of titanium tetraetoxide (IV) are added over 15.6 g of a hydroxide solution of 4-methyl-2,3,6,7,-tetrahydro-1H,5H-pyrido [3,2,1-ij] quinolinium (ROH) containing 0.3 hydroxide equivalencies in 1000 g and 1.7 g of a 25% aqueous solution of tetramethylammonium hydroxide (TMAOH). Then, 0.65 g of germanium oxide are added to this mixture that it is then left to evaporate while stirring until the ethanol produced by the TEOS hydrolysis plus the necessary amount of water have evaporated completely and the final composition as noted has been reached. Finally, 0.37 g of fluorhydric acid (50% of HF by weight) are added. The composition of the resulting gel is:

0.67SiO$_2$.0.33GeO$_2$.0.01TiO$_2$.0.25ROH :0.25TMAOH:0.5HF:7H$_2$O

The mixture obtained is then introduced in an autoclave equipped with an internal polytetrafluorethylene sheath and heated at 150° C. during 6 days. The X-ray diffractogram of the solid obtained when filtering, washing with distilled water and dried at 100° C. shows that the material thus obtained is a LTA zeolite. The visible ultraviolet spectrum of this material shows bands in the 190 to 300 nm region, indicating that Ti is a part of the structure of the material.

The invention claimed is:

1. A crystalline material with LTA structure of zeolitic nature that in its calcined and anhydrous state, and in the absence of defects in its crystalline lattice has the following empirical formula: x(M$_1$/nXO$_2$):z ZO$_2$:y GeO$_2$:(1−y) SiO$_2$ where M is H+ or at least one +n charged inorganic cation; X is at least one chemical element in +3 oxidation state; Z is at least one cation in an oxidation state of +4 different from Si and Ge; wherein x has a value between 0 and 0.15, y has a value between 0 and 1, and z has a value between 0 and 0.1.

2. A crystalline material according to claim 1, wherein it has been prepared from a reaction mixture that has at least a 4-methyl-2,3,6,7,-tetrahydro-1H,5H-pyrido [3,2,1-ij] quinolinium cation as an organic compound source.

3. A crystalline material according to claim 1, wherein in the state just as synthesized, the X-ray diffraction pattern, as measured by a fixed divergence slit and using the Kα-Cu radiation, is as follows:

| d (Å) ± 0.4 | I (I * 100/I$_0$) |
|---|---|
| 12.00 | mf |
| 8.48 | m |
| 6.92 | 100 |
| 5.99 | md |
| 3.99 | f |
| 3.61 | d |
| 3.32 | md |
| 3.20 | md |
| 2.90 | md |
| 2.55 | md | where mf is a very strong relative intensity that corresponds to 99-80% of the peak of greatest intensity; f is a strong relative intensity that corresponds to 60-80% of the peak of greatest intensity; m is a medium relative intensity that corresponds to 40-60% of the peak of greatest intensity; d is a weak relative intensity that corresponds to 20-40% of the peak of greatest intensity; md is a very weak relative intensity that corresponds to less than 20% of the peak of greatest intensity.

4. A crystalline material according to claim 1, wherein in its calcined and anhydrous state its x-ray diffraction pattern is:

| d (Å) ± 0.4 | I (I * 100/I$_0$) |
|---|---|
| 12.00 | 100 |
| 8.47 | f |
| 6.91 | d |
| 5.35 | md |
| 3.98 | md |
| 3.60 | md |
| 3.31 | md |
| 3.19 | md |
| 2.90 | md |
| 2.54 | md | where, f is a strong relative intensity that corresponds to 60-80% of the peak of greatest intensity; d is a weak relative intensity that corresponds to 20-40% of the peak of greatest intensity; md is a very weak relative intensity that corresponds to less than 20% of the peak of greatest intensity.

5. A crystalline material according to claim 1 wherein Z is selected from the group consisting of Ti and Sn.

6. A crystalline material according to claim 5, wherein in its calcined and anhydrous state its x-ray diffraction pattern is:

| d (Å) ± 0.4 | I (I * 100/I₀) |
|---|---|
| 12.00 | 100 |
| 8.47 | f |
| 6.91 | d |
| 5.35 | md |
| 3.98 | md |
| 3.60 | md |
| 3.31 | md |
| 3.19 | md |
| 2.90 | md |
| 2.54 | md | where mf is a very strong relative intensity that corresponds to 99-80% of the peak of greatest intensity; f is a strong relative intensity that corresponds to 60-80% of the peak of greatest intensity; m is a medium relative intensity that corresponds to 40-60% of the peak of greatest intensity; d is a weak relative intensity that corresponds to 20-40% of the peak of greatest intensity; md is a very weak relative intensity that corresponds to less than 20% of the peak of greatest intensity.

7. A procedure to synthesize the microporous crystalline material of claim 5 in which a reaction mixture contains a source of $SiO_2$, optionally, a source of $GeO_2$, optionally, a source of one or several tetravalent elements Z different from Si and Ge, at least one source of the organic compound R, a source of fluoride, and water, is heated at a temperature between 80 and 200° C., until crystallization is achieved, wherein the reaction mixture has a composition, in terms of molar relationships between the following ranges:

| | |
|---|---|
| $R/(SiO_2 + GeO_2)$: | 0.05-1.0 |
| $ZO_2/(SiO_2 + GeO_2)$: | 0-1.0 |
| $GeO_2/(SiO_2 + GeO_2)$: | 0-1.0 |
| $F/(SiO_2 + GeO_2)$: | 0.1-3.0 |
| $H_2O/(SiO_2 + GeO_2)$: | 1-50. |

8. A procedure according to claim 7 wherein Z is Ti or Sn.

9. A procedure according to claim 7 wherein R is 4-methyl-2,3,6,7,-tetrahydro -1H,5H-pyrido [3,2,1-ij] quinolinium cation or a mixture of said cation with the tetramethylammonium cation or with ethylenglycol.

10. A procedure according to claim 7 wherein the temperature is between 100° and 200° C.

11. A crystalline material according to claim 1, wherein in the state just as synthesized, the X-ray diffraction pattern, as measured by a fixed divergence slit and using the Ka-Cu radiation, is as follows:

| d (Å) ± 0.4 | I (I * 100/I₀) |
|---|---|
| 12.00 | mf |
| 8.48 | m |
| 6.92 | 100 |
| 5.99 | md |
| 3.99 | f |
| 3.61 | d |
| 3.32 | md |
| 3.20 | md |
| 2.90 | md |
| 2.55 | md | where mf is a very strong relative intensity that corresponds to 99-80% of the peak of greatest intensity; f is a strong relative intensity that corresponds to 60-80% of the peak of greatest intensity; d is a weak relative intensity that corresponds to 20-40% of the peak of greatest intensity; md is a very weak relative intensity that corresponds to less than 20% of the peak of greatest intensity.

12. A procedure to synthesize the microporous crystalline material of claim 1, in which a reaction mixture that contains a source of $SiO_2$, optionally, a source of $GeO_2$, optionally, a source of one or more of several trivalent elements X, optionally, a source of +n inorganic cations M, at least one source of organic compound R, a source of fluoride, and water, is heated at a temperature between 80 and 200° C., until crystallization is achieved, wherein the reaction mixture has a composition, in terms of molar relationships between the following ranges:

| | |
|---|---|
| $R/(SiO_2 + GeO_2)$: | 0.05-1.0 |
| $M_1/nOH/(SiO_2 + GeO_2)$: | 0-1.0 |
| $X_2O_3/(SiO_2 + GeO_2)$: | 0-1.0 |
| $GeO_2/(SiO_2 + GeO_2)$: | 0-1.0 |
| $F/(SiO_2 + GeO_2)$: | 0.1-3.0 |
| $H_2O/(SiO_2 + GeO_2)$: | 1-50. |

13. A procedure according to claim 12, wherein that a quantity of crystalline material is added to the reaction mixture as crystallization promoter, said quantity being up to 20% by weight in relation to the total of inorganic oxides added.

14. A procedure according to claim 12 wherein X is selected from the group consisting of Al, B, Ga and Fe.

15. A procedure according to claim 12 wherein R is 4-methyl-2,3,6,7,-tetrahydro -1H,5H-pyrido [3,2,1-ij] quinolinium cation or a mixture of said cation with tetramethylammonium cation or with ethylenglycol.

16. A procedure according to claim 15, wherein the 4-methyl-2,3,6,7, -tetrahydro-1H,5 H-pyrido [3,2,1 -ij] quinolinium and the tetramethylammonium organic cations are added as hydroxides or as salts, or as a mixture of both.

17. A procedure according to claim 16 wherein the organic cations are added as a halide.

18. A procedure according to claim 12 wherein the temperature is between 100° and 200° C.

19. A method to convert feedings formed by organic compounds in the presence of a catalyst comprising adding a catalytically active form of the material described in claim 1 as a catalyst.

20. A method to separate gases in the presence of an adsorbent comprising adding a catalytically active form of the material described in claim 1 as an adsorbent.

21. An adsorbent for gases and vapours comprising an active form of the material described in claim 1.

22. A crystalline material according to claim 1 wherein X is selected from the group consisting of Al, B, Ga and Fe.

23. A crystalline material according to claim 1 wherein y has a value lower than 0.75.

24. A crystalline material according to claim 1 wherein z has a value lower than 0.05.

* * * * *